United States Patent
Brenton et al.

(10) Patent No.: US 7,640,581 B1
(45) Date of Patent: Dec. 29, 2009

(54) METHOD AND SYSTEM FOR PROVIDING SECURE, CENTRALIZED ACCESS TO REMOTE ELEMENTS

(75) Inventors: James Albert Brenton, Olathe, KS (US); Matthew Hermstedt, Olathe, KS (US); Michael Lee Martin, Overland Park, KS (US); David Wayne Reece, Harrisonville, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 690 days.

(21) Appl. No.: 10/789,292

(22) Filed: Feb. 27, 2004

(51) Int. Cl.
*H04L 29/06* (2006.01)

(52) U.S. Cl. ........................................ 726/12
(58) Field of Classification Search .................. 726/3, 726/8, 12
See application file for complete search history.

(56) References Cited

U.S. PATENT DOCUMENTS

| | | | | |
|---|---|---|---|---|
| 5,845,265 A * | 12/1998 | Woolston | ..................... | 705/37 |
| 5,916,302 A * | 6/1999 | Dunn et al. | .................. | 709/204 |
| 5,944,824 A * | 8/1999 | He | ................................ | 726/6 |
| 6,151,628 A * | 11/2000 | Xu et al. | ..................... | 709/225 |
| 6,678,826 B1 * | 1/2004 | Kelly et al. | .................... | 726/2 |
| 2001/0024446 A1 * | 9/2001 | Craig et al. | .................. | 370/412 |
| 2002/0118671 A1 * | 8/2002 | Staples et al. | ............... | 370/352 |
| 2003/0018916 A1 * | 1/2003 | Smith et al. | ................. | 713/201 |
| 2003/0219008 A1 * | 11/2003 | Hrastar | ....................... | 370/352 |

* cited by examiner

*Primary Examiner*—Gilberto Barron, Jr.
*Assistant Examiner*—Cordelia Kane
(74) *Attorney, Agent, or Firm*—Sonnenschein Nath & Rosenthal LLP

(57) ABSTRACT

A system and method for establishing centralized, out-of-band access to remote network elements is provided. Status and other information can be securely retrieved from the remote elements. One or more servers observe and manage a plurality of remote elements using modem-to-modem communications between a modem bank and a remote modem. Requests are submitted through a central mediation point, thereby allowing central control of user profiles and a collection of security audit log information. One or more authentication mechanisms provide enforced security measures and trusted communication paths between a user and a remote element. Remote elements can be securely monitored and administered from a central location.

21 Claims, 5 Drawing Sheets

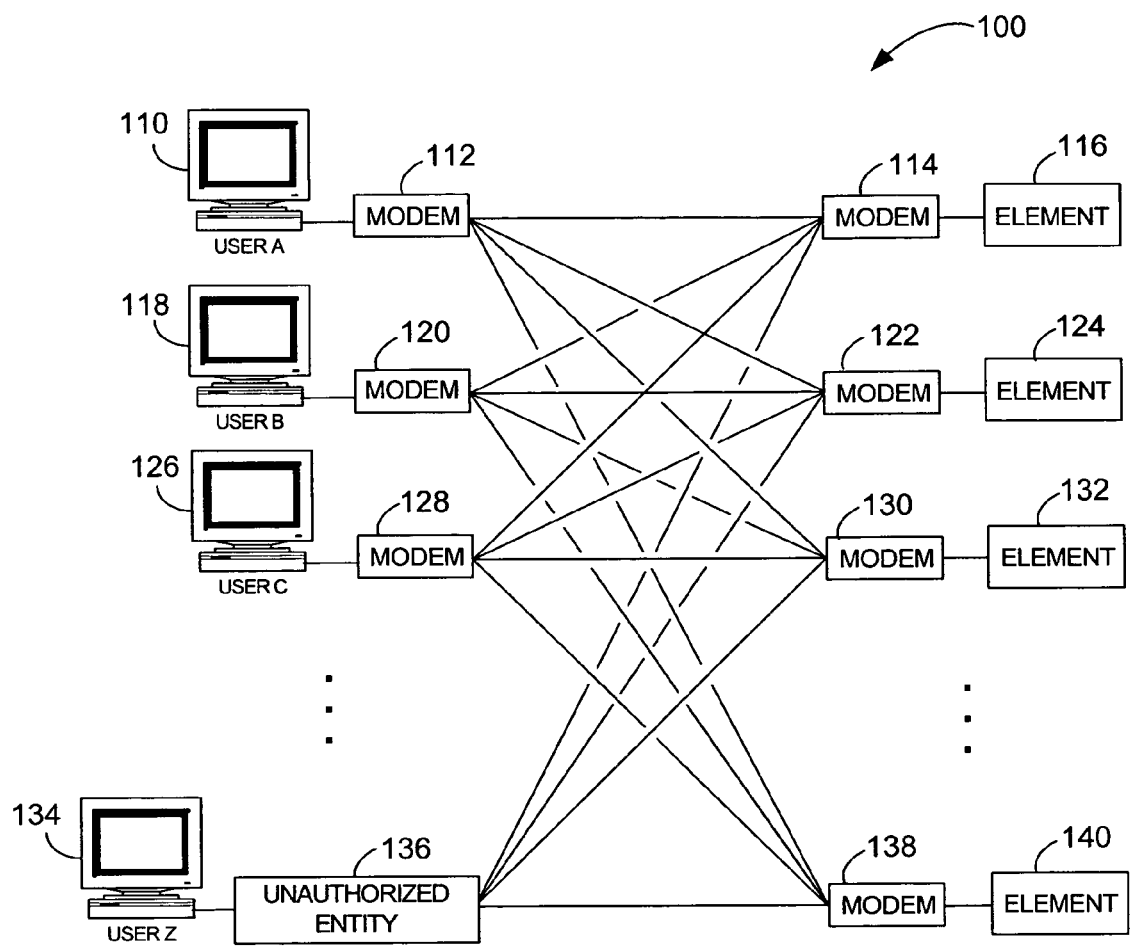
FIG. 1 - (PRIOR ART)

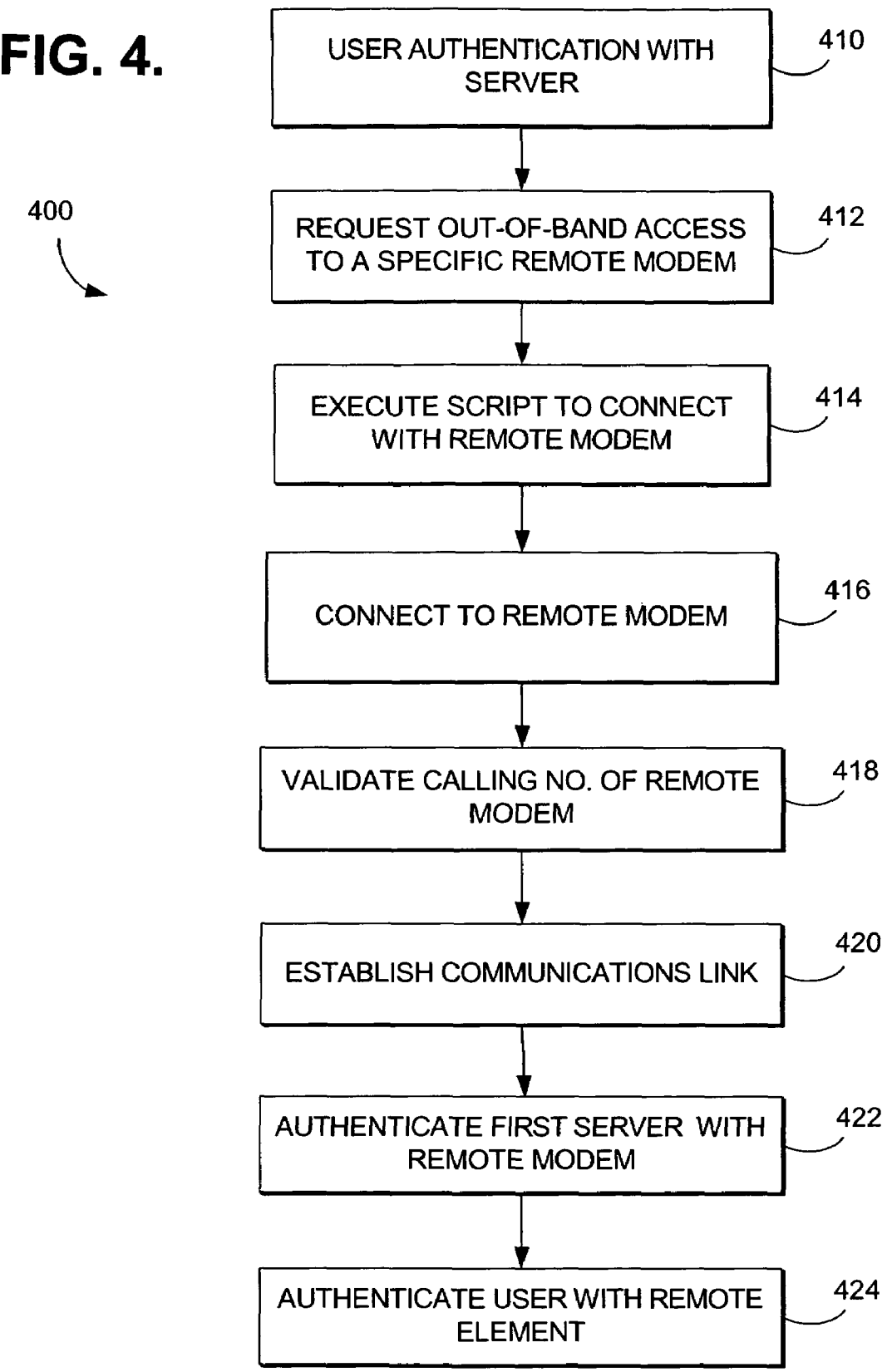

METHOD AND SYSTEM FOR PROVIDING SECURE, CENTRALIZED ACCESS TO REMOTE ELEMENTS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the field of telecommunications. More particularly, the present invention relates to providing centralized out-of-band access to remote elements.

BACKGROUND OF THE INVENTION

In a telecommunication network, a plurality of network elements facilitates services such as telephone, Internet access, and wireless communication. Each of these services requires a vast number of communications points for communicatively connecting entities. As used herein, "remote elements" refers to any network element that is located in a different geographic location from an operations facility to access or control that element. Thus, if a person desires to monitor the status of a particular element that is 1000 feet away or in a different city, that curbside element (for example) is remote with respect to the operations facility. Exemplary network elements include Digital Subscriber Line Access Multiplexers (DSLAMs), Digital Line Concentrators (DLCs), hubs, switches, access modems, and other electronic components. These network elements are often present in a location remote from a management and operations facility.

Remote elements serve a litany of purposes and perform various functions, such as helping connect a subscriber to a service provider's network. Remote network elements are typically housed in an enclosure located near a subscriber's residence. Thousands of enclosures and elements may reside in a single city's telecommunication network. These remote network elements must be monitored to ensure that they are operating correctly. To monitor the status of these network elements, a service provider observes the status of the network elements by implementing alarm functions or status codes for each of the remote elements and communicate the status of the element back to the management or operations facility.

The conventional method of observing network status and receiving alarm messages is through communications over a private, operational-support network and/or "in-band" communication channels over a subtended network to the networks. These channels are not accessible by the customer. In the event of an operational-support network outage or loss of the "in-band" network management channel due to a problem with the remote network element, network connectivity would not be available for remote, network element restoration. The conventional methods for remote, network element restoration are to either dispatch a service technician to the remote network element or to use modem communications to access the element.

But conventional methods of employing modem communications to monitor remote elements suffers from various problems, including, for example, an inability to determine and control who accesses the device, and the insecurity that has historically been associated with establishing a trusted communications pathway to the remote device. For example, service providers typically use a modem located at various curbside enclosures to transmit the remote network element's status back to the central office. However, modems often communicate without secure-identification access mechanisms that would exclude intruders from accessing the network. Moreover, no centralized access-control mechanism is available (absent the present invention).

Currently, service providers rely on relatively insecure methods to access remote modems, and remote elements in turn. Communicating the status of network elements may be performed using dual connected workstations coupled to each other via modems. Modem-to-modem communication provides one workstation with the ability to dial-up and connect to another workstation using standard telephone service. Modem communication may be used to allow service providers to dial-up and gain access to curbside elements. But accessing remote elements via modems in this manner does not provide a secure path nor a method to properly manage network resources.

If a user wants to access a remote modem coupled to a remote element, a telephone number to the remote modem is simply dialed, and direct communication can occur with the network element. User-access restrictions (policy-enforcement measures, log-in control, central administration, authentication, authorization, and more) are unavailable in modem-to-modem communications. Accordingly, the need exists for a system and method that centralizes remote-element control in a network and can establish secure modem access, employing user-level authentication and other mechanisms to provide a trusted pathway between modems coupled to the remote elements.

To better illustrate a portion of the shortcomings of the prior art, reference is made to FIG. 1. FIG. 1 depicts the decentralized nature of a typical prior-art system 100 that employs modem-to-modem communication. The lack of security in system 100 is apparent in that a receiving modem 114 must accept calls from any phone number. Determining the myriad of possible origination numbers associated with a requesting modem 112 is too difficult. Accordingly, modem 114 cannot efficiently restrict access to itself (and thus a remote element 116) based on a dialed number.

For example, user A at workstation 110 connects to remote element 116 via a communication path between modem 112 and modem 114. But modem 122 must also accept calls from modem 120, 128, and potentially hundreds of other modems. Because so many potential origination numbers exist, destination modems 114, 122, 130, and 138 accept all calls. Such a scheme renders the destination modems vulnerable to access by an intruder or other unauthorized entity 136. The destination modems must rely on some form of user authentication. But administering a user-authentication scheme in such a decentralized system 100 is prohibitively difficult. Destination modems 114, 122, 130, and 138 are individually programmed to accept certain users. As those users change, each destination modem must be updated. Tracking current authorized users and updating the myriad of individual modems is almost impossible in even a moderately complex network.

Communicating with a thousand or more remote elements back to a central office requires sophisticated system-management resources and network security. Service providers maintain a high level of trust with customers, and do so, by providing reliable and secure networks. The provider needs to know when a remote element loses power, becomes inoperable, or otherwise malfunctions. A service provider needs to be aware when remote elements are broken, vandalized, or damaged due to natural or accidental occurrences. In a prior-art technique, the service provider dispatches a technician to a faulty element to troubleshoot and repair the deficiency. This scenario is costly, time-consuming, resource intensive, and delays service restoration. The current state of the art could be improved by providing a protected system and method to securely administer and monitor remote elements centrally utilizing an out-of-band process.

As alluded to earlier, one of the problems associated with the prior art is the lack resource-management control. Any person equipped with a remote modem's access phone number could potentially dial-up and connect with the remote element. Virtually any person can access the remote modem. Also, no security is provided to preclude an unauthorized entity from contacting and possibly corrupting one or more of the remote elements through the insecure remote modem. What is needed is a centralized, secure administration system that allows specific users to contact certain remote elements, easy modification of respective user privileges, and a secure method of communicating with the remote elements.

BRIEF SUMMARY OF THE INVENTION

The present invention is a system and method for centrally establishing secure access to a plurality of modems using an out-of-band access scheme. The present invention can be used to control any remotely located network element coupled to a remote modem. Systems and methods in accordance with the present invention can direct communication between a user and one or more elements. The present invention provides secure access to elements through a centralized administration system, and establishes a trusted communications pathway between a user and an element using remote communications, such as modem communications. Moreover, the present invention greatly reduces the overhead historically associated with monitoring and controlling remote elements, reduces or eliminates need for technicians to be dispatched to a faulty network element, offers a remote-element-control alternative to an in-band process, and reduces system-restoration time in the event of a network element outage.

In one aspect, the present invention provides one or more servers for managing user requests for communicating to a remote network element using a modem. A first server requests user authentication prior to initiating a dial-up sequence with a remote modem. User authentication prevents unauthorized users from accessing dial-out modems and subsequent access to the remote element. User-access privileges are administered by a first server. Requests to access an element using a modem are logged by the first server. A call-access log provides a historical record for administrative review. A second server modem bank is coupled to the first server and is used to manage and select an appropriate modem within a modem bank. If a request is directed by the first server, the second server may select a modem and establish a communications link with a remote modem.

In another aspect, the present invention provides a plurality of secure modems. A plurality of modems may be used to communicate network information back to a user. In a preferred embodiment, a plurality of modems performs authentication using a login identifier to access network elements and communicates operational status of a plurality of network elements.

In another aspect of the invention, a method is provided for central administration of authorized users, their roles and access privileges, their command-initiation privileges, and a protected system (audit) log of each user's access to all remote modems and network elements and their activities and commands.

In a final exemplary aspect of the invention, a method is provided for establishing secure access with a plurality of modems. The method includes requesting access to a network element for obtaining operational status, executing scripts to communicate with a remote modem, validating a dialed number between an originating and destination party, authenticating a user with the remote modem using security credentials, and requesting user identification to obtain access to said network element.

The present invention reduces or eliminates unnecessary dispatch calls and the number of visits to the network elements. A server-managed modem bank accesses remote modems, and "stand-alone" modems located at a user's workstation are no longer be required to establish communications with a remote element via modem. Authentication mechanisms provide secure out-of-band access to network elements. Additionally, a secure pathway to a provider's switch is established by employing one or more security measures, such as selective call acceptance (SCA) and/or Automatic Number Identification (ANI).

BRIEF DESCRIPTION OF THE SEVERAL
VIEWS OF THE DRAWING

The present invention is described in detail below with reference to the attached drawing figures, wherein:

FIG. 1 depicts an illustrative prior-art system, which allows insecure modem-to-modem communication;

FIG. 4 illustrates a method in accordance with an embodiment of the present invention for establishing communication between a user and a network element via modems.

DETAILED DESCRIPTION OF THE INVENTION

Figure 2A:
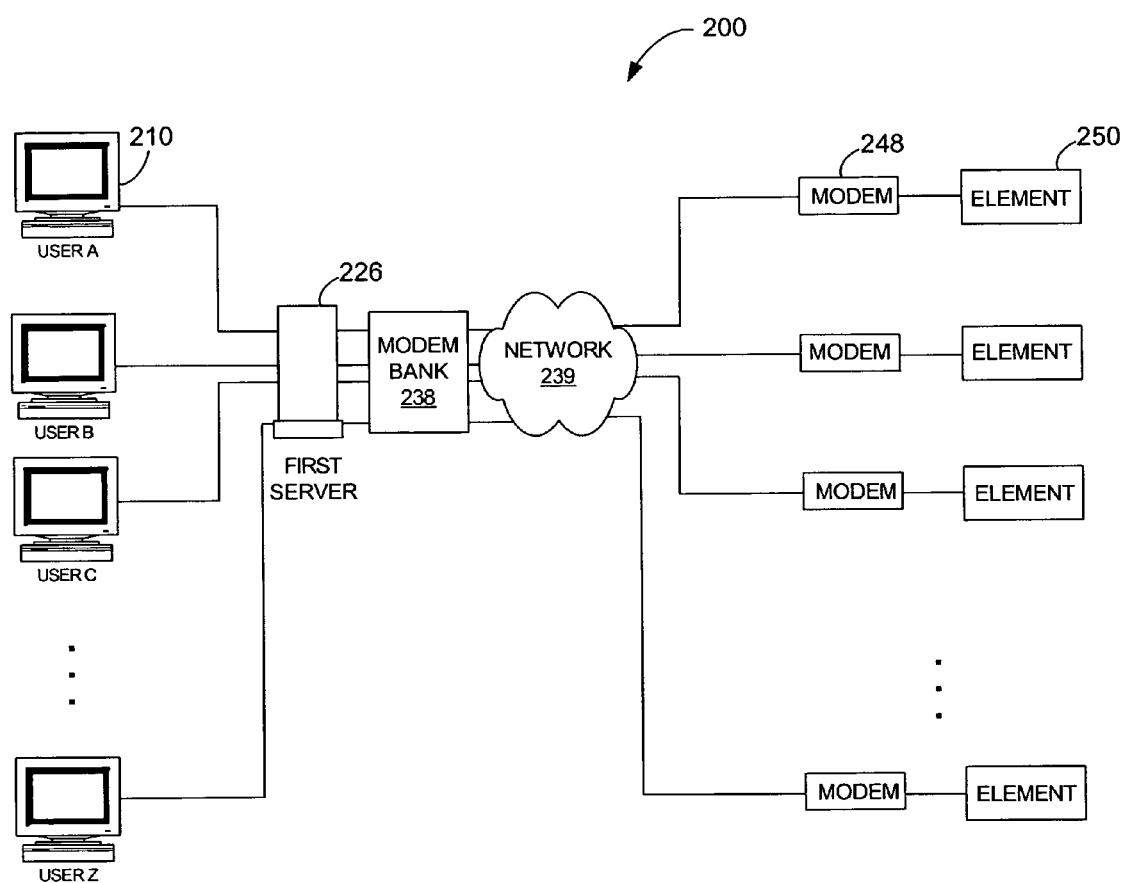
FIG. 2A illustrates a system in accordance with an embodiment of the present invention for establishing secure, centralized access between a workstation and a group of remote network elements.

The present invention provides an improved method for communicating with a remote element using out-of-band access modem control. The description that follows is directed to one or more embodiments, and should not be construed as limiting in nature. The present invention incorporates a server connected to a modem bank to establish access with one or more remote elements. The present invention offers several practical applications in the technical arts, not limited to providing centralized secure access to network elements through the management of one or more servers. The network resources, both remote elements and remote modems use authentication mechanisms to restrict access to a known set of users in a preferred embodiment. Moreover, the server manages a modem bank for connecting users to a remote modem, which communicates with a remote network element.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ANI Automatic Number Identification
ATM Asynchronous Transfer Mode
DLC Digital Line Concentrator
DSL Digital Subscriber Line
DSLAM Digital Subscriber Line Access Multiplexer
NOC Network Operations Center
SCA Selective Call Acceptance
SONET Synchronous Optical Network
VPN Virtual Private Network Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and not limitation, computer-readable media include data-storage media and communications media.

Data-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, Digital Versatile Discs (DVD), holographic media or other optical storage devices, magnetic cassettes, magnetic tape, magnetic disk storage, and other magnetic storage devices. These memory components can store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The present invention may assume various embodiments in connection with its use in "in-band" or "out-of-band" communication-access methods. In-band access may be a trusted communications link that permits provider/carrier access to obtain direct access to remote elements. For example, in-band access may be take the form of high-speed Frame Relay, Asynchronous Transfer Mode (ATM), Synchronous Optical Networks (SONET) or other connections to manage the remote element. Out-of-band access may be a separate network used for managing and keeping in-band networks operational, and may be, for example, a secondary line of service communicating with remote elements within the service provider's management and operations facility. Both are unseen from a subscriber's point of view. Out-of-band access may be a telephone service, cable service, or high-speed network service operating outside of the service provider's traditional network path.

Turning now to FIG. 2A, an exemplary operating environment of the present invention is shown and referenced generally by the numeral 200. One or more users connect to one or more remote elements through a centralized mediation point via a modem bank 238 (or other communications components) through a network 239, which can be a circuit-based network or a packet-based network such as the Internet. User A, for example, located on a workstation 210 communicates through a centralized security-enforcement point, such as server 226, which acts as a governing gateway between a user and a remote element using secure and trusted paths to one or more remote modems 248. User A submits a request to remotely communicate with a remote element 250 through remote modem 248. Employing server 226 prevents unauthorized intruders from accessing the remote elements. As will be explained in greater detail below, exemplary security techniques include validating requisite security credentials (such as a user name and password, public and private keys, and the like), authenticating a user at a remote element, and limiting the pool of origination numbers or addresses that are allowed to access remote modem 248.

By directing all user requests though a central device, such as server 226, administering user profiles is greatly simplified. For example, the profiles associated with users A, B, C, and D can all be stored on server 226. A user's access privileges can be updated quickly from a single place, server 226. If new users need to be added, they can be added at one location.

Centralizing user-access to remote modems 248 also allows the pool of originating numbers to be greatly reduced. As will be explained in greater detail with reference to FIG. 3, a central modem bank can now be used to access remote elements 314. Thus, the corresponding remote modems 248 are preferably configured to not receive calls, except, through predetermined phone numbers or addresses. Originating numbers are no longer so large for limiting calls received based on the origination number when configuring remote modems 248. Quite to the contrary, remote modems 248 are configured to receive calls from only a select group of phone numbers, such as those from a central modem bank.

Figure 2B:
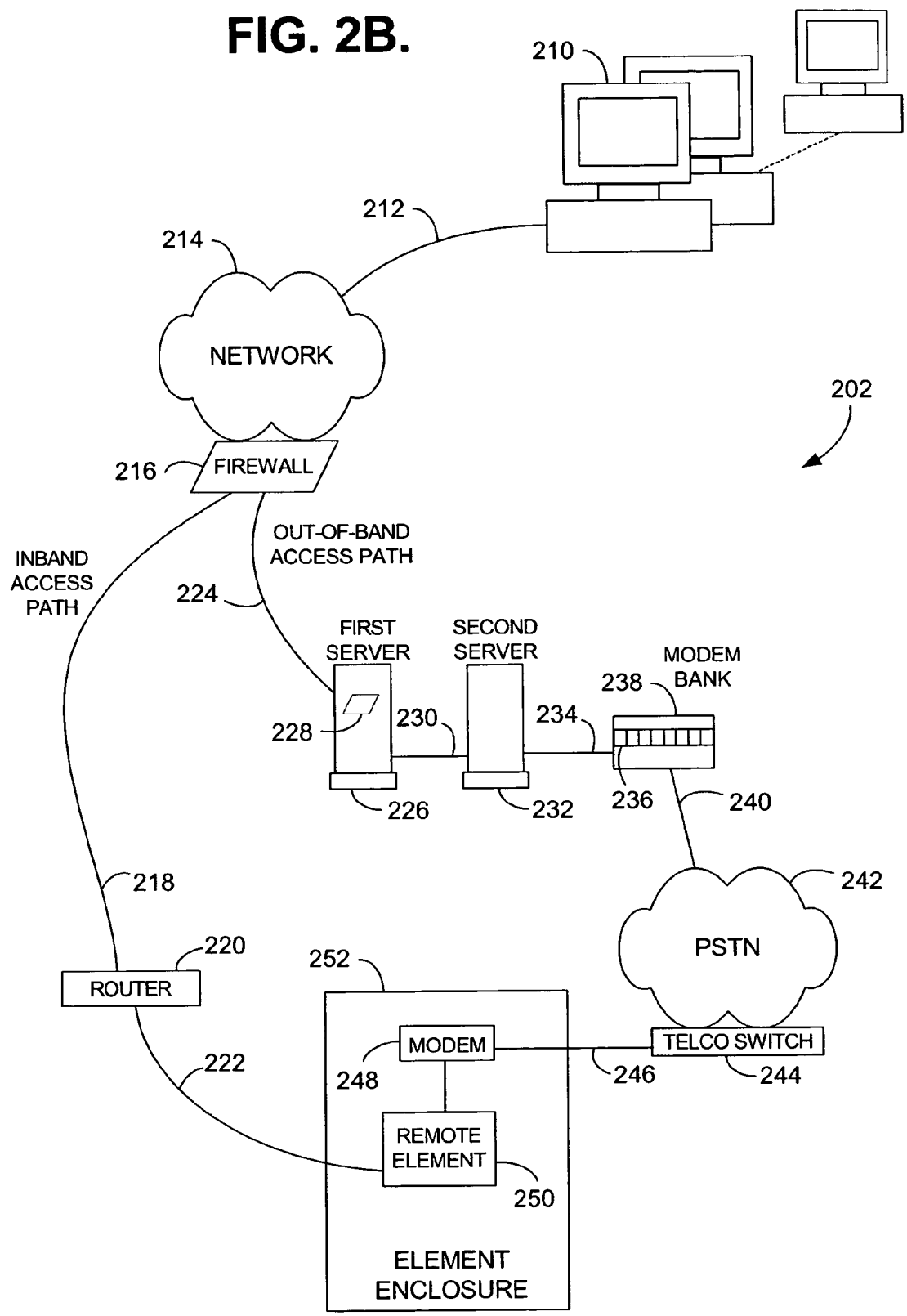
FIG. 2B illustrates in greater detail a system in accordance with an embodiment of the present invention for establishing secure communication between a user workstation and a network element.

Referring now to FIG. 2B, a more detailed illustration of an embodiment of the present invention is provided, and referenced generally by the numeral 202. An exemplary embodiment of the present invention indicates that a service is transmitted from workstation 210, located within a central office or network operations center (NOC), and transmitted across network 214 via connection 212. Firewall 216 allows the service to be transmitted to router 220 via connection 218. To maintain security within network 214, firewall 216 provides restricted access to any process attempting to enter from network 214. Router 220 may multiplex one or more in-band access paths to a plurality of remote sites 252.

An out-of-band access path 224 is provided for communicating with remote element 250. Computer workstation 210 connects a user to a first server 226. Computer workstation 210 is conventional in nature and may be a plurality of computer workstations located within a large business environment. Computer workstation 210 contacts first server 226 over a network 214, such as a Local Area Network (LAN), Metropolitan Area Network (MAN), Wide Area Network (WAN), or other network, including the Internet. An exemplary communications protocol includes TCP/IP, but the present invention is not limited to this particular protocol. The scope of the present invention is not limited to any protocol. In addition, computer workstation 210 is not limited to any particular type of computer workstation, but may be a laptop, palm top, or hand-held device.

As previously mentioned, in-band access provides a service to a carrier/provider to remote element 250. A service may be transmitted from workstation 210 located within a remote-control site, and transmitted across network 214 via connection 212. Firewall 216 allows the service to be transmitted to router 220 via connection 218. In-band access paths provide a trusted path between the remote-control site and element 250. Router 220 may multiplex one or more in-band access paths to a plurality of remote sites 252.

To provide access to a plurality of remote devices, a modem bank 238 is used in a preferred embodiment. Modem banks or "modem pools" as they are sometimes referred are widely used for Internet service providers and allow one or more users to communicate with the Internet using one of the pooled modems 236. Modem banks vary in size and may contain 200 or more modems depending on user or subscriber demands. A common modem bank may be, for example, an "Ascend MAX 4048," which provides 24-pooled modems in one enclosure. The scope of the invention is not limited to any particular modem bank.

A firewall 216 preferably excludes unauthorized users from accessing devices below firewall 216 from network 214. A firewall 216 performs like a one-way gate that allows internal users to access information outside a LAN or WAN but blocks outside users from transmitting data into the network. A firewall may be, for example, a "Cisco PIX 535 series," but is not limited to this particular model. The firewall may be an embedded system housed in a separate enclosure, or may be a firewall software program operating within a server or workstation. Again, the scope of the present invention is not limited to any particular firewall.

In a preferred embodiment, first server 226 provides a computer readable program 228 for managing and administering user requests. Computer readable program 228 allows first server 226 to centralize all communications between user workstation 210 and remote elements 250. Computer readable program 228 provides authentication of users via a user lookup list or table, operates as a mediator for requesting a modem 236 within a modem bank 238 with a second server 232, and accommodates requests for out-of-band connectivity to an element. Modems can be embedded components. Computer readable program 228 is responsible for logging authorized/unauthorized user requests by administering a system audit log file with user information and time/dates. Moreover, computer readable program 228 acts to restrict unwanted users from accessing remote modems and elements.

Remote modem 248 and remote element 250 are housed within a remote site 252 in some embodiments. Remote site 252 may be one of a plurality of enclosures remotely placed throughout a city, a central office, or any other location where a remote device may be installed. Each remote site may house a remote modem 248 and a remote element 250. Remote modem 248 may be internal to the remote network device, or a stand-alone modem, which is connected to the network element through a communications cable and port. Subscriber lines and electrical power can be located within the remote site as well. An exemplary remote modem 248 suitable for use in accordance with the present invention is a "Series 2000 Modem" offered by CTEK Inc. Other modems may be used as well. The scope of the invention is not intended to be limited to this particular type of modem.

A second server 232 preferably manages the use of a modem bank 238, which may include a plurality of modems 236. If a request to communicate with a remote element 250 is made by workstation 210, then first server 226 validates the user's identity and authorization levels by verifying the user's security credentials, which may include login information, authentication values, network address, or the time of day or day of week, with a lookup table located within first server 226 in one embodiment. If the user's information is valid for connecting with the remote element 250, first server 226 communicates with second server 232 to establish modem communication. Second server 232 determines which modem 236 is available in modem bank 238 and may select a modem 236 based upon a rotational selection scheme. Second server 232 dials the remote modem's number to establish a connection with the remote modem 248. First server 226 may log the user's dial-up information within a log file for administrative purposes.

First server 226 and second server 232 may be equipped to facilitate Virtual Private Network (VPN) connections using high-speed frame relay, Asynchronous Transfer Mode (ATM), or Synchronous Optical Networks (SONET) connections. The scope of the invention is not limited to any particular wiring or network architecture. In addition, the scope of the present invention is not limited to any particular type of server, network protocol, or server feature. One or more additional servers may provide additional functionality with the present invention.

According to a preferred embodiment of the present invention, a user requests access to a remote element 250 using workstation 210. Workstation communicates a request across network 214 to first server 226. First server 226 preferably validates a user using a login scheme to determine access rights with remote elements 250. If a user request is valid, first server 226 establishes a communications link with a second server 232 via connection 230. It is understood that two servers 226 and 232 are not necessary, and the applications running on both servers could be consolidated into a single computing device.

Second server 232 determines an available calling modem 236 within modem bank 238 via connection 234. If a modem 236 is available, modem bank 238 communicates back to second server 232 enabling modem 236 for communication. Second server 232 dials a number corresponding to a remote modem 248 to attempt communication with remote element 250. Selective call acceptance (SCA) is preferably employed to validate that the calling modem in bank 238 has permission to access remote modem 248. Additionally, Automatic Number Identification (ANI) may be used to validate a calling number at remote modem 248 via connection 246.

If a trusted path is established between modem 236 and remote modem 248, then remote modem 248 may request authentication by requesting identification and authentication credentials, such as a username and password from the calling modem. Once remote modem 248 validates the user, remote element 250, preferably, provides authentication prior to actually granting access to remote element 250. Additional security measures such as encryption may be used to protect data packets. Encrypting the data packets between the workstation 210 and remote 250 prevents unauthorized users from tampering with secure system information.

If a user at workstation 210 is not validated at server 226, access is denied to the user. In addition, an access log containing invalid user information may be generated. First server 226 is responsible for monitoring an access log for both valid and invalid users. If workstation 210 makes a request to communicate with a remote element 250, but is not identified within a lookup table in first server 226, then access may be denied and a log entry generated.

Figure 3:
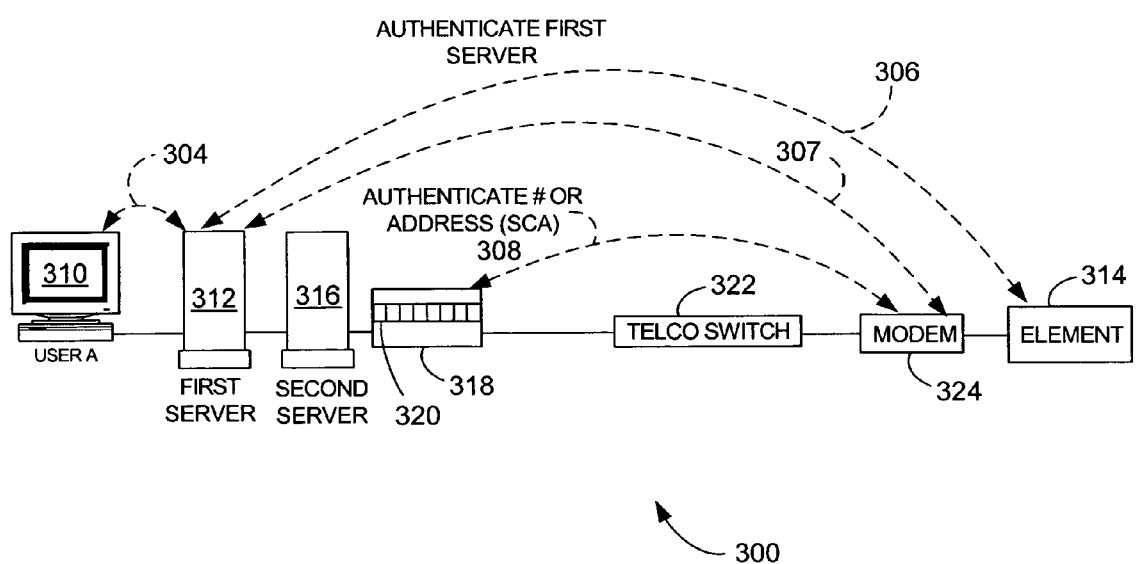
FIG. 3 illustrates a system in accordance with an embodiment of the present invention for authorizing secure access between a user workstation and a network element using a server and access modems.

Referring now to FIG. 3, an out-of-band access communications system 300 is depicted, illustrating security enforcement points that provide multiple levels of authentication. Four levels (304, 306, 307, and 308) are shown for illustrative purposes. User A located at a workstation 310 communicates a request to first server 312 to communicate with remote element 314. First server 312 authenticates 304 user A at workstation 310 by validating a user's access credentials, which may consist of user name, password and other optional authentication credentials. First server 312 requests modem communication with modem bank 318. Second server 316 determines an available modem using a software program that contains a rotational section list, for example. If available, modem 320 is initialized and connected with first server 312. A desired remote-modem number is dialed, and a switch 324 is accessed. Switch 322 is located within the communications network and provides selective call acceptance between the modem bank 318 and remote modem 324.

If an unauthorized user tries access remote modem 324, first server 312 authenticates provides a first line of defense 304. First server 312 communicates to second server 316 by requesting a modem 320 located within modem bank 318 using a rotational selection list. During modem-to-modem communication, remote modem 324 authenticates with modem bank 318 through switch 322. Selective call acceptance is employed to determine whether the calling number is allowed, thereby providing a second line of defense 308. If an unknown communication path is determined, the communications request will not be granted. Otherwise, first server 312 establishes communication between user workstation 310 and remote modem 324. But prior to accessing information from a remote element 314, a third level of authentication 306 validates credentials such as username and password (or some other mode) to access the specific network element 314, sort of akin to letting a person in a building but restricting access to certain floors. An additional layer of security 307 can be provided whereby remote modem 324 solicits requisite security credentials from first server 312. If authorization is successful, workstation 310 is authorized to access remote element 314 information.

Referring now to FIG. 4, a method 400 in accordance with an embodiment of the present invention is illustrated for facilitating communication with a network element. One skilled in the art will appreciate that a modem used in connection with a method in accordance with the present invention may be any device capable of receiving and transmitting data packets.

At a step 410, a workstation attempts to authenticate with a server. Step 410 may occur, for example, when a first server 226 requests to establish a communication pathway with remote element. Authentication occurs when the user provides valid identification and authentication parameters, either through IP verification, a login mechanism, or established proxy settings. Authentication information may be omitted, but such an omission may detrimentally impact the security of communication in accordance with an alternative embodiment of the present invention.

At a step 412, a workstation requests out-of-band access to a specific remote modem. A request from the workstation to a specific remote modem is processed through one or more servers providing out-of-band access to the remote modem. A request may not be made unless first server 226 successfully authenticates the user in step 410. In a preferred embodiment, the server executes a script to connect with a remote modem in step 414. A script is an executable computer file. The script may be executed by one server that directs a second server to perform a service. In a preferred embodiment, a first server may direct a second server to establish a communications pathway with a remote modem.

At a step 416, the second server connects to a remote modem. The second server may comprise a computer file embodied with a rotational selection list for selecting an available modem from the modem bank. The second server may receive the number and initialize connection with the selected modem within the modem bank.

At a step 418, the central-office switch validates the calling number of the remote modem. Validation may be performed using Selective Call Acceptance (SCA) or Automatic Number Identification (ANI). The scope of the present invention is not limited to either one or the other of the validation mechanisms. Either one or the other may be used, or both may be used to provide a trusted path. Validation using SCA or ANI are two exemplary methods for enforcing a trusted path between the modem bank and the remote modem. SCA establishes a trusted path by permitting only preselected numbers to establish communication with a remote modem. Pre-selection of numbers may be established and maintained at the service provider's switch. ANI provides similar functionality to SCA, except that the remote modem may be used to support automatic hang-up with a mandatory callback feature to authorized users.

In step 420, the modem bank establishes a communications link with the remote modem. A communications link will be established subject to the validation of step 418. At a step 422, first server 226 authenticates with a remote modem by submitting appropriate security access credentials. In addition, the remote element may require appropriate security credentials to obtain access to the remote element's information. In step 424, first server 226 authenticates with the remote element. In this embodiment, the user may now access information from the remote element through the secure path established by the first server to the remote network element.

It should be appreciated that the above sets forth an illustrative example of a telecommunication network and communications method comprising modem communication with remote elements. The present invention is not limited to a particular type of computer device, network device, server, service, or modem, nor is it limited to a specific network protocol or architecture. Many aspects of the present invention may be implemented using computer software embodied on computer-readable media to be executed on a computer or other machine. The use of such computer software may be particularly useful to establish communication between the wide variety of different network-communication devices and services. The present invention is not limited to the use of any particular computer or other machine to execute the machine-readable code. These and other variations will be apparent to one of ordinary skill in the art.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

One skilled in the technical arts will understand that incorporation of centralized servers within the present invention improves the management/administration of user accounts over the prior art. By implementing a centralized server with a modem bank, an improved system and method is established, which acts as a security enforcement point for administering secure out-of-band access across a network. Centralizing user access enforces security measures for protecting company assets. In addition, by implementing a centralized server in an out-of-band access network, a carrier/provider will establish security and trusted paths for preventing unwanted users from accessing remote elements. Moreover, remote modems will only be accessible through a secure and trusted path. This eliminates the need to support/supply new or existing workstation modems, and allows existing remote modems to remain unchanged.

It will be understood that certain features and subcombinations are of utility and may be employed without reference to other features and subcombinations and are contemplated within the scope of the claims. Not all steps listed in the various figures need to be carried out in the specific order described.

What is claimed is:

1. A system for accessing remote devices on a communications network, comprising:
    a first network configured to enable a user computing device to access remote network elements;
    a firewall in communication with said first network and configured to restrict access to said first network and the user computing device;
    a router in communication with said firewall and a remote network element, an in-band access path defined by a communication path between the user computing device and the remote network element via said first network, firewall, and router;
    a first server in communication with said firewall;
    a modem bank in communication with said first server and further in communication with the remote network elements via a public switched telephone network (PSTN), an out-of-band access path defined by a communication path between the user computing device and the remote network element via said first network, firewall, first server, modem bank, and PSTN, and wherein the in-band access path from the firewall to the remote network element and the out-of-band access path from the firewall to the remote network element are two distinct paths;
    said first server configured to:
        (1) receive a request to communicate with the one or more remote network elements over the out-of-band access path;
        (2) authenticate a user;
        (3) facilitate a session with a second server for establishing connection with an external network element;
        (4) establish secure pathway over the out-of-band access path between the user computing device and the one or more remote network elements; and
        (5) transmit data for communicating operational status of the one or more remote network elements between the one or more network elements and the user computing device over the secure pathway; and
    said modem bank including a plurality of modems in communication with said first and second servers and operable to authenticate the request to access the one or more remote network elements and to communicate the operational status of the one or more remote network elements.

2. The communications system of claim 1, wherein said second server is further operable to select a specific modem.

3. The communications system of claim 1, wherein said first server is further operable to log invalid modem-login attempts.

4. The communications system of claim 1, wherein said first server is further operable to allow specific access to privileged users for accessing network elements.

5. The communications system of claim 1, wherein the second server is in communication with said first server and modem bank via said first server, and configured to select a modem in the modem bank over which to communicate information communicated between the user computing device and remote network elements.

6. A method for securely retrieving a status of one or more remote devices, the method comprising:
    communicating between a user computing device and a network element via an in-band access path, the in-band access path including a firewall and router;
    communicating between the user computing device and the network element via an out-of-band access path, the out-of-band access path including the firewall, a first server, a modem bank, and a public switched telephone network, and wherein the in-band access path from the firewall to the remote network element and the out-of-band access path from the firewall to the remote network element are two distinct paths;
    requesting, from the user computing device, out-of-band access to the network element via one of a plurality of modems located in the modem bank configured to communicate with a remote modem in communication with the network element;
    communicating, from the network element via the out-of-band access path with the one of a plurality of modems, with the remote modem;
    authenticating, by the first server, a request to access the remote modem;
    establishing, by the first server, a secure pathway over the out-of-band access path between the user computing device and network element; and
    transmitting data for communicating operational status of the network element between the network element and the user computing device over the secure pathway.

7. The method of claim 6, wherein authenticating a request includes validating a number dialed to determine if a request from said number is authorized to connect with said remote modem.

8. The method of claim 7, wherein authenticating a request further includes processing security credentials to obtain access to the network element.

9. The method of claim 6, wherein authenticating a request further includes one or more selections from the following:

providing a trusted communications pathway between a source element and a destination element using selective call acceptance (SCA);

encrypting communicated data to secure network communications;

authenticating said source and destination elements; and utilizing automatic number identification (ANI) to authenticate a calling request.

10. One or more computer-readable storage media having computer-useable instructions embodied thereon, the instructions, when executed on a computing device, cause the computing device to:

receive a first request via an out-of-band process to establish an out-of-band communications pathway with a network device; wherein the out-of-band access communications pathway includes a firewall, a first server, a modem bank, and a public switched telephone network;

receive a security identifier to authenticate said first request;

identify a dial-up number for accessing a remote modem;

capture information associated with said first request to a log file;

direct a server to identify one of a plurality of modems located in the modem bank that can provide feedback related to said network device;

authenticate a second request, said second request being a request to access said remote modem;

authenticate a third request, said third request being a request to access said network element; and transmit data for communicating operational status of the network element between the network element and a user computing device over an in-band pathway established between the user computing device and the network element, the in-band pathway includes the firewall and a router, and wherein the in-band access path from the firewall to the remote network element and the out-of-band access path from the firewall to the remote network element are two distinct paths.

11. The media of claim 10, wherein receiving a first request further comprises establishing a communications pathway by exchanging packets of information using one or more network protocols.

12. The media of claim 11, wherein receiving a first request further comprises issuing a command to the network device to authenticate access to the network device.

13. The media of claim 10, wherein receiving a security identifier includes receiving one or more security-credential components.

14. The media of claim 10, wherein identifying a dial-up number includes:

issuing a request from a user;

receiving a telephone number for dialing; and validating said telephone number against a predetermined dialing list.

15. The media of claim 10, wherein capturing information includes capturing session information.

16. The media of claim 15, wherein said session information includes data related to one or more of the following events:

failed attempts to access a network resource;

successful attempts to access one or more elements designated as sensitive or critical components;

logon successes and failures;

account creation or deletion;

account maintenance activity;

dial-up activity;

periods of system non-availability; and security-administration activities.

17. The media of claim 15, wherein information captured includes one or more of the following:

a user identifier;

a time stamp;

a date stamp;

a logon attempt;

a logoff attempt;

a network address;

a client identifier;

a user's location;

a dialed access number; and a reason for logging an event.

18. The media of claim 10, wherein directing a server to select a modem includes:

sending a request to establish a communications link with a remote modem;

selecting a modem from a modem pool;

receiving a response from said server to establish a link with said pooled modem; and dialing a telephone number to said pooled modem to establishing a link with said remote modem.

19. The media of claim 10, wherein authenticating a second request to access said remote modem includes:

receiving login identification for accessing said remote modem;

verifying said login identification against a list of authorized users; and notifying said user with a status response.

20. The media of claim 19, wherein said log-in identification is a username and password.

21. The media of claim 19, wherein said status response is an approval or denial to access said remote modem.

* * * * *